United States Patent [19]

Iizuka et al.

[11] 4,277,573
[45] Jul. 7, 1981

[54] VINYL CHLORIDE RESIN AND ALKYL METHACRYLATE RESIN PROCESSING AID COMPOSITION

[75] Inventors: Yo Iizuka, Iwaki, Japan; Susumu Midorikawa, deceased, late of Iwaki, Japan, by Taeko Midorikawa, heir; Kiyoshi Midorikawa, heir; Yumi Midorikawa, heir, both of Iwaki, Japan

[73] Assignee: Kureha Kagaku Kogyo Kabushiki Kaishi, Tokyo, Japan

[21] Appl. No.: 85,519

[22] Filed: Oct. 17, 1979

[30] Foreign Application Priority Data

Oct. 17, 1978 [JP] Japan .................................. 53-127693

[51] Int. Cl.$^3$ ...................... C08L 27/06; C08L 33/10; C08L 33/12; C08L 51/06
[52] U.S. Cl. ...................................... 525/85; 525/83; 525/84; 525/228
[58] Field of Search ...................... 525/228, 85, 83, 84

[56] References Cited

U.S. PATENT DOCUMENTS

| | | | |
|---|---|---|---|
| 3,660,529 | 5/1972 | Groch | 525/85 |
| 3,689,598 | 9/1972 | Bierwirth et al. | 525/228 |
| 3,969,469 | 7/1976 | Love | 525/228 |
| 3,971,835 | 7/1976 | Myers et al. | 525/85 |
| 4,052,482 | 10/1977 | Ide et al. | 525/85 |

FOREIGN PATENT DOCUMENTS

850947 10/1960 United Kingdom .................... 525/228

*Primary Examiner*—Carman J. Seccuro
*Attorney, Agent, or Firm*—Wenderoth, Lind & Ponack

[57] ABSTRACT

A vinyl chloride resin composition comprises:
(1) 100 parts of vinyl chloride polymer; and
(2) 0.1 to 30 parts of a polymer processing aid comprising:
(A) 40 to 90 parts of a copolymer comprising
80 to 100% of an alkyl methacrylate, and
0 to 20% of a monomer copolymerizable therewith; and
(B) 60 to 10 parts of a copolymer comprising
20 to 79% of an alkyl methacrylate,
20 to 79% of an aromatic vinyl monomer,
1 to 49% of diolefin, and
0 to 20% of a monomer copolymerizable therewith, the copolymers (A) and (B) having been wet-blended to provide 100 parts of the polymer processing aid, all quantities expressed in parts and percentages being by weight.

This vinyl chloride resin composition comprising a novel polymer processing aid not only shows an increased gelation rate, yields less ungelled particles and possesses excellent processability such as an increased elongation at a high temperature, but particularly possesses excellent mechanical properties because the impact strength of the composition is not appreciably lowered by the addition of the polymer processing aid.

10 Claims, 3 Drawing Figures

4,277,573

VINYL CHLORIDE RESIN AND ALKYL METHACRYLATE RESIN PROCESSING AID COMPOSITION

BACKGROUND OF THE INVENTION

The present invention relates to a vinyl chloride resin composition possessing improved processability and excellent mechanical properties. More particularly, the invention relates to a vinyl chloride resin composition comprising a polymer processing aid comprising an alkyl methacrylate copolymer and a copolymer comprising as its essential constituents an alkyl methacrylate, an aromatic vinyl monomer and diolefin.

While vinyl chloride polymers are widely used because of their excellent physical and chemical properties, there remain various disadvantageous problems in their processability, such as a narrow range of processing temperatures at which forming or molding can be carried out due to only a small difference between the processing temperatures and thermal decomposition temperature of the polymer, and also a slow rate of gelation. It is well known that such drawbacks can be eliminated to some extent by the addition of a plasticizer. However, the addition of a plasticizer not only gives rise to other problems such as evaporation or migration of the plasticizer, but also deteriorates the mechanical properties of formed polymer products.

On the other hand, in order to obtain improved processability so that the formed products of the polymer will have a smooth surface, the rate of gelation will be increased, and deep drawing will be successfully carried out, there have been some attempts to add to a vinyl chloride polymer, as a polymer processing aid, a copolymer having compatibility therewith, such as a copolymer of styrene and acrylonitrile, a copolymer predominantly comprising methyl methacrylate and styrene, or a copolymer predominantly comprising methyl methacrylate and an alkyl acrylate.

However, all these prior art methods for improving the processability of vinyl chloride polymers have serious drawbacks as follows.

A copolymer predominantly comprising styrene and acrylonitrile impairs the thermal stability of the polymer, and does not significantly improve its processability such as the gelation rate and deep drawing properties.

In comparison with the copolymer of this type, copolymers predominantly comprising methyl methacrylate and styrene and copolymers predominantly comprising methyl methacrylate and an alkyl acrylate effectively accelerate the gelation rate and also increase the elongation at a high temperature, whereby satisfactory deep drawing properties can be obtained, and adaptability for fabrication, for example, vacuum forming, is markedly improved.

However, on the other hand, these copolymers lower the mechanical strength of a resin composition. In particular, a composition obtained by adding a polymer processing aid as described above to a composition comprising a vinyl chloride polymer and an impact strength modifier such as an acrylonitrile/butadiene/styrene copolymer or a methyl methacrylate/butadiene/styrene copolymer has a notably lowered impact strength.

SUMMARY OF THE INVENTION

As a result of our extensive research on the relationship between the processability and mechanical properties, particularly impact strength of a vinyl chloride polymer, it has been found that a polymer processing aid comprising a wet blend of a copolymer predominantly comprising an alkyl methacrylate and a copolymer predominantly comprising an alkyl methacrylate, an aromatic vinyl monomer and diolefin can impart excellent processability to the vinyl chloride polymer without impairing its mechanical properties. On the basis of this finding, we have arrived at the present invention.

The vinyl chloride resin composition of this invention possessing improved processability and excellent mechanical properties comprises (1) 100 parts of a vinyl chloride polymer; and (2) 0.1 to 30 parts of a polymer processing aid comprising (A) 40 to 90 parts of a copolymer comprising 80 to 100% of an alkyl methacrylate and 0 to 20% of a monomer copolymerizable therewith, and (B) 60 to 10 parts of a copolymer comprising 20 to 79% of an alkyl methacrylate, 20 to 79% of an aromatic vinyl monomer, 1 to 49% of diolefin, and 0 to 20% of a monomer copolymerizable therewith, the copolymers (A) and (B) having been wet-blended to provide 100 parts of the polymer processing aid, all quantities in parts and percentages set forth above and elsewhere herein being by weight.

DETAILED DESCRIPTION OF THE INVENTION

Figure 1:
FIGS. 1, 2, and 3 are photomicrographs (×40) each showing the surface of a formed product (filament of vinyl chloride resin) to be used for evaluation of the surface smoothness of a product formed from the composition according to the present invention.

The polymer processing aid according to the present invention comprises a wet blend of an alkyl methacrylate copolymer (A) and a copolymer comprising alkyl methacrylate, an aromatic vinyl monomer and diolefin. The term "wet blend" as used herein is intended to mean both a polymer blend obtained by blending the copolymers (A) and (B) in latex form and a polymer obtained by adding and polymerizing the constituent monomers of either one of the copolymers in the presence of the other copolymer. In the latter case, the constituent monomers of the copolymer (B) may be added to and polymerized with the copolymer (A) or vice versa. Of these blending methods including the latex blending, a particularly preferred method comprises adding the constituent monomers of the copolymer (B) to the copolymer (A) and subjecting the same to polymerization. This method, as compared with the other methods, effectively prevents occurrence of ungelled particles, and further ensures improved surface smoothness and transparency. A polymer blend obtained by a method other than the above described wet-blending, for example, a polymer obtained by blending the copolymers (A) and (B) in powder form, will result in lower processability and transparency of the composition obtained.

The term "addition and polymerization" or "polymerization of monomers in the presence of a copolymer" is herein used in a broader sense than "graft polymerization", and all of the monomers to be charged in the second-stage polymerization, which is carried out after the first-stage polymerization, need not necessarily be grafted on the copolymer obtained in the first stage, but part of the monomers may be polymerized in an ungrafted state to give a polymer blend.

Relative to 40 to 90 parts of the copolymer (A), 60 to 10 parts of the copolymer (B) is used in accordance with the present invention. A smaller quantity of the copolymer (A) results in poor performance of the polymer processing aid, while the use of this copolymer in greater quantity is undesirable because many ungelled particles occur.

The copolymer (A) comprises 80 to 100%, preferably 90 to 100%, of an alkyl methacrylate; and 0 to 20%, preferably 0 to 10%, of one or more monomers copolymerizable therewith.

For an alkyl methacrylate, that having 1 to 8, preferably 1 to 4, carbon atoms in the alkyl group is used, and methyl methacrylate is particularly preferred.

The addition of a smaller quantity of the alkyl methacrylate to the copolymer (A) is undesirable because the effect of improving the processability of the resin composition becomes poor.

Examples of monomers copolymerizable with the alkyl methacrylate are alkyl acrylates such as methyl acrylate, ethyl acrylate, n-butyl acrylate, and 2-ethylhexyl acrylate; aromatic vinyl compounds such as styrene, α-methyl styrene, and chlorostyrene; unsaturated nitriles such as acrylonitrile, and methacrylonitrile; vinyl ethers such as methyl vinyl ether, and ethyl vinyl ether; vinyl ketones such as methyl vinyl ketone, and ethyl vinyl ketone; and vinyl esters such as vinyl acetate.

The copolymer (B) comprises 20 to 79%, preferably 30 to 69%, of an alkyl methacrylate; 20 to 79%, preferably 30 to 69%, of an aromatic vinyl monomer; 1 to 49%, preferably 1 to 30%, of diolefin; and 0 to 20% of one or more monomers copolymerizable therewith.

If the quantity of an alkyl methacrylate is smaller, or that of an aromatic vinyl monomer is greater, than the quantities specified above, the performance of the polymer processing aid obtained will be poor. Conversely, in case an alkyl methacrylate is used in greater quantities, or an aromatic vinyl monomer is used in smaller quantities, the polymer processing aid will not be uniformly dispersed in a vinyl chloride polymer under ordinary processing conditions, and there will remain numerous ungelled particles.

Diolefin is added in a quantity of 1 to 49% of the copolymer (B). Less than 1% of the diolefin deteriorates the mechanical properties, particularly the impact strength of the use resin composition, while the diolefin in excess of the above quantity converts the copolymer (A) into a rubber, resulting in poor thermal stability of the composition.

In order to obtain a transparent composition, a vinyl chloride polymer must have a refractive index close to that of a polymer processing aid to be added thereto.

In view of this requirement, it is preferable that the copolymer (B) comprise 30 to 69% of an alkyl methacrylate, 30 to 69% of an aromatic vinyl monomer, and 1 to 30% of diolefin.

All ratios herein specified refer to the ratios between the contents of the respective components of the composition, polymer processing aid or copolymer. However, since the degree of polymerization of each polymer is ordinarily 95% or higher, as also is the case in the Examples set forth hereinlater, the above ratios can be regarded as substantially identical with the ratios between the monomers charged.

For an alkyl methacrylate which is one of the constituents of the copolymer (B), an alkyl methacrylate having 1 to 8, preferably 1 to 4, carbon atoms in the alkyl group is used, and methyl methacrylate is most beneficial.

For an aromatic vinyl monomer, styrene, α-methyl styrene or chlorostyrene is used, and styrene is especially suitable.

For diolefin, butadiene, isoprene or chloroprene is used.

Examples of monomers copolymerizable with the alkyl methacrylate, aromatic vinyl monomer and diolefin are alkyl acrylates such as methyl acrylate, ethyl acrylate, n-butyl acrylate, and 2-ethylhexyl acrylate; unsaturated nitriles such as acrylonitrile, and methacrylonitrile; vinyl ethers such as methyl vinyl ether, and ethyl vinyl ether; vinyl ketones such as methyl vinyl ketone, and ethyl vinyl ketone; vinyl esters such as vinyl acetate; and polyfunctional monomers such as divinylbenzene, and ethylene glycol dimethacrylate. One or more of these monomers can be used in a quantity ranging from 0 to 20%.

In order to obtain the polymer processing aid of the present invention, each of the copolymers (A) and (B) is preferably prepared by emulsion polymerization wherein a known emulsifier, and a water-soluble, oil-soluble or redox polymerization initiator can be utilized.

The degree of polymerization can be freely controlled by conventional combinations of polymerization temperatures and chain transfer agents. It is preferable that the degree of polymerization of the polymer processing aid be such that the reduced viscosity thereof is at least 0.1 dl/g, preferably at least 0.5 dl/g, as measured at 20° C. with a solution of 0.4 g of the polymer processing aid in 100 cc of chloroform.

The vinyl chloride polymers to be blended with the polymer processing aid according to the present invention include: polyvinyl chloride; a copolymer of at least 80% of vinyl chloride and one or more of monomers copolymerizable therewith, such as vinylidene chloride, vinyl acetate, acrylic ester, acrylonitrile, ethylene, and propylene; derivatives of the polyvinyl chloride and the copolymer, such as resins obtained by further chlorination of the above mentioned polymers; or a mixture of two or more polymers selected from the above groups.

The polymer processing aid of this invention is added in a quantity of 0.1 to 30 parts, preferably 0.5 to 15 parts, for 100 parts of a vinyl chloride polymer. If this aid is added in smaller quantity, the effect of improving the processability of the polymer becomes poor, while greater quantities of this aid deteriorate the innate properties of the vinyl chloride polymer.

If desired, the resin composition of the present invention may comprise, in addition to the aforesaid vinyl chloride polymer and polymer processing aid, optional additives such as stabilizers, antioxidants, ultraviolet ray absorbents, lubricants, impact strength modifiers, plasticizers, coloring agents, fillers, and blowing agents in conventional quantities.

The polymer processing aid according to the present invention is particularly effective when used in combination with a conventional impact strength modifier for vinyl chloride polymers such as an acrylonitrile/butadiene/styrene copolymer and a methyl methacrylate/butadiene/styrene copolymer, and can improve the processability of the resin composition obtained without appreciably lowering the impact strength thereof as compared with known polymer processing aids.

The impact strength modifier is preferably used in a quantity of 1 to 30 parts for 100 parts of a vinyl chloride polymer.

In order to indicate more fully the nature and utility of this invention, the following specific examples of practice constituting preferred embodiments of the invention and comparison examples are set forth, it being understood that these examples are presented as illustrative only and are not intended to limit the scope of the invention.

EXAMPLE 1

300 parts of distilled water, 1.0 part of sodium dodecylbenzenesulfonate which had been dissolved in water, 0.03 part of potassium persulfate, 0.0075 part of sodium hydrogensulfite, 75 parts of methyl methacrylate, and 0.075 part of n-dodecyl mercaptan were charged into a reactor provided with a stirrer. The atmosphere within the reactor was purged with nitrogen, and then the temperature in the reactor was raised to 50° C. with stirring. The mixture obtained was subjected to a reaction at this temperature for 6 hours. Thereafter, 0.01 part of potassium persulfate, 0.0025 part of sodium hydrogensulfite, 9.0 parts of methyl methacrylate, 11.5 parts of styrene, 4.5 parts of butadiene, and 0.025 part of n-dodecyl mercaptan were added, and the resulting mixture was subjected to a reaction at 50° C. for 15 hours. After cooling of the reaction mixture, the latex obtained was subjected to precipitation with aluminium sulfate, and subsequently neutralized, filtered, washed with water, and dried, whereupon a polymer (Polymer Processing Aid No. 1) was obtained. The conversion was 99.0%. This Polymer Processing Aid No. 1 was found to have a reduced viscosity of 3.27 dl/g as measured at 20° C. with a solution of 0.4 g thereof in 100 cc of chloroform.

5 to 15 parts of this polymer was blended with 87 parts of polyvinyl chloride (average degree of polymerization: 700), 13 parts of an impact strength modifier (methyl methacrylate/butadiene/styrene copolymer: BTA-III, mfd. by Kureha Kagaku Kogyo, K.K., Japan), 2.0 parts of a dioctyltinmercapto compound, 0.8 part of stearyl alcohol, and 0.2 part of partially saponified butyleneglycol montanate. The resulting composition was tested for the properties shown in Table 1. The results obtained are summarized in Table 2.

EXAMPLE 2

300 parts of distilled water, 1.0 part of sodium dodecylbenzenesulfonate which had been dissolved in water, 0.02 part of potassium persulfate, 0.005 part of sodium hydrogensulfite, 50 parts of methyl methacrylate, and 0.03 part of n-dodecyl mercaptan were charged into a reactor provided with a stirrer. The atmosphere within the reactor was purged with nitrogen, and then the temperature in the reactor was raised to 50° C. with stirring. The mixture obtained was subjected to a reaction at this temperature for 6 hours. Thereafter, 0.02 part of potassium persulfate, 0.005 part of sodium hydrogensulfite, 22 parts of methyl methacrylate, 22 parts of styrene, 6 parts of butadiene, and 0.5 part of n-dodecyl mercaptan were added, and the resulting mixture was subjected to a reaction at 50° C. for 15 hours. After cooling of the reaction mixture, the latex obtained was subjected to precipitation with aluminium sulfate, and subsequently neutralized, filtered, washed with water, and dried, whereupon a polymer (Polymer Processing Aid No. 2) was obtained.

This Polymer Processing Aid No. 2 was tested for the properties shown in Table 1 in exactly the same manner as in Example 1, and the results set forth in Table 2 were obtained.

EXAMPLE 3

300 parts of distilled water, 1.0 part of sodium dodecylbenzenesulfonate which had been dissolved in water, 0.02 part of potassium persulfate, 0.005 part of sodium hydrogensulfite, 50 parts of methyl methacrylate, and 0.03 part of n-dodecyl mercaptan were charged into a reactor provided with a stirrer. The atmosphere within the reactor was purged with nitrogen, and then the temperature in the reactor was raised to 50° C. with stirring. The mixture obtained was subjected to a reaction at this temperature for 6 hours. Thereafter, 0.02 part of potassium persulfate, 0.005 part of sodium hydrogensulfite, 20 parts of methyl methacrylate, 20 parts of styrene, 9 parts of butadiene, and 0.6 part of n-dodecyl mercaptan were added, and the resulting mixture was subjected to a reaction at 50° C. for 15 hours. After cooling of the reaction mixture, the latex obtained was subjected to precipitation with aluminium sulfate, and subsequently neutralized, filtered, washed with water, and dried, whereupon a polymer (Polymer Processing Aid No. 3) was obtained.

Polymer Processing Aid No. 3 thus obtained was tested for the properties set forth in Table 1 under the same conditions as in Example 1. The results are summarized in Table 2.

COMPARISON EXAMPLE 1

A polyvinyl chloride resin composition was prepared under the same conditions as in Example 1 except that no polymer processing aid was added. The composition obtained was tested for the properties shown in Table 1 in the same manner as in Example 1, and the results set forth in Table 2 were obtained.

COMPARISON EXAMPLE 2

300 parts of distilled water, 1.0 part of sodium dodecylbenzenesulfonate which had been dissolved in water, 0.02 part of potassium persulfate, 0.005 part of sodium hydrogensulfite, 50 parts of methyl methacrylate, and 0.03 part of n-dodecyl mercaptan were charged into a reactor provided with a stirrer. The atmosphere within the reactor was purged with nitrogen, and then the temperature in the reactor was raised to 50° C. with stirring. The mixture obtained was subjected to a reaction at this temperature for 6 hours. Thereafter, 0.02 part of potassium persulfate, 0.005 part of sodium hydrogensulfite, 25 parts of methyl methacrylate, 25 parts of styrene, and 0.5 part of n-dodecyl mercaptan were added, and the resulting mixture was subjected to a reaction at 50° C. for 15 hours. After cooling of the reaction mixture, the latex obtained was subjected to precipitation with aluminium sulfate, and subsequently neutralized, filtered, washed with water, and dried, whereupon a polymer (Polymer Processing Aid No. 5) was obtained.

This Polymer Processing Aid No. 5 was tested similarly as in Example 1, and the results shown in Table 2 were obtained.

COMPARISON EXAMPLE 3

A commercially available polymer processing aid predominantly comprising methyl methacrylate and an alkyl acrylate was tested similarly as in Example 1. The results obtained are summarized in Table 2.

EXAMPLE 4

A composition comprising 300 parts of water, 1.0 part of sodium dodecylbenzenesulfonate, 0.04 part of potassium persulfate, 0.01 part of sodium hydrogensulfite, 100 parts of methyl methacrylate, and 0.06 part of n-dodecyl mercaptan was subjected to polymerization at 50° C. for 15 hours to obtain a polymer latex (A).

Separately, a composition comprising 300 parts of water, 1.0 part of sodium dodecylbenzenesulfonate, 0.04 part of potassium persulfate, 0.01 part of sodium hydrogensulfite, 44 parts of methyl methacrylate, 44 parts of styrene, 12 parts of butadiene, and 1.0 part of n-dodecyl mercaptan was subjected to polymerization at 50° C. for 15 hours to obtain a polymer latex (B).

The polymer latexes (A) and (B), after being thoroughly mixed with each other, were subjected to a post-treatment under the same conditions as in Example 1 to obtain a polymer (Polymer Processing Aid No. 4).

This Polymer Processing Aid No. 4 was tested similarly as in Example 1, and the results set forth in Table 2 were obtained.

TABLE 1

Strength & Elongation

Each polymer composition was kneaded for 3 min. with rolls having a surface temperature of 160° C., and pressed for 3 min. at 200° C. to prepare a polymer sheet sample of 1.0 mm thickness. This sheet sample was cut into strips from which specimens formed into JIS-No. 1 dumbbell shape were prepared through a plain cutter. The strength and elongation of each dumbbell specimen was measured by means of Tensilon UTM-L (mfd. by Toyo Sokki K.K., Japan).

| [Measurement Conditions] | |
|---|---|
| Temperature | : 150° C. |
| Sample length | : 40 mm |
| Pulling rate | : 500 mm/min. |

Surface Smoothness

Figure 2:
Figure 3:
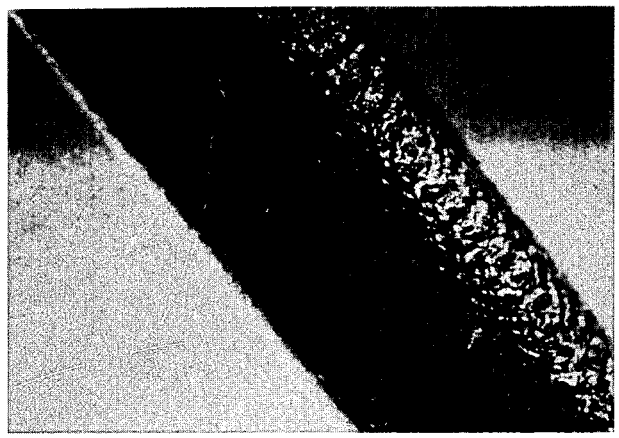

Each polymer composition was kneaded for 3 min. with rolls having a surface temperature of 160° C., and formed into a filament through a Koka-type flow tester. The surface smoothness of this filament was evaluated upon magnifying the surface thereof 40 times with an optical microscope. For the evaluation, the filament surface was graduated into five grades: A, B, C, D and E. The photomicrographs of the filament surfaces used as the evaluation standard are shown in the illustrations. Only the surfaces rated A, C and E are shown in the illustrations (FIG. 1 . . . A, FIG. 2 . . . C, and FIG. 3 . . . E), and those rated B and D fall therebetween.

| [Filament Preparation Conditions] | |
|---|---|
| Nozzle | : 1.0 mm$\phi$ × 10 mm |
| Load | : 150 kg/cm$^2$ |
| Temperature | : 200° C. |
| Preheating | : 4 min. |
| Sample | : 1.5 g |

Transparency

Each polymer composition was kneaded for 3 min. with rolls having a surface temperature of 160° C., and pressed for 3 min. at 200° C. to prepare a polymer sheet sample of 3 mm thickness. The parallel ray transmittance (Tp) and haze (H) of this sheet sample were measured by means of a hazeometer of integrating sphere type with C-filter in accordance with JIS K-6714.

Impact Strength (Izod Impact Strength)

Each polymer composition was kneaded for 3 min. with rolls having a surface temperature of 160° C., and pressed for 7 min. at 200° C. to prepare a polymer sheet sample of 6 mm thickness. This sheet sample was formed into specimens with V-notches in accordance with ASTM D-256-54T. The Izod impact strength of each specimen was measured at 23° C.

TABLE 2

| Example No. | Quantity of Polymer Processing Aid Added (part) | Properties of Vinyl Chloride Resin Composition ||||||
|---|---|---|---|---|---|---|---|
| | | Strength & Elongation || Surface Smoothness | Transparency || Izod Impact Strength (kg . cm/cm) |
| | | Elongation (%) | Breaking Strength (kg/cm$^2$) | | Tp (%) | H (%) | |
| Example 1 | 5 | 191 | 7.7 | A | 83.0 | 4.1 | 73.6 |
| | 10 | — | — | — | — | — | 18.4 |
| | 15 | — | — | — | — | — | 8.5 |
| 2 | 5 | 184 | 7.5 | A | 83.6 | 3.9 | 67.2 |
| | 10 | — | — | — | — | — | 20.4 |
| | 15 | — | — | — | — | — | 10.3 |
| 3 | 5 | 180 | 7.6 | A | 83.1 | 4.0 | 80.9 |
| | 10 | — | — | — | — | — | 58.6 |
| | 15 | — | — | — | — | — | 12.7 |
| 4 | 5 | 181 | 7.5 | A | 82.7 | 4.3 | 65.0 |
| | 10 | — | — | — | — | — | 20.1 |
| | 15 | — | — | — | — | — | 9.8 |
| Comparison Example 1 | — | 145 | 7.8 | E | 83.0 | 3.8 | 106 |
| 2 | 5 | 185 | 7.7 | A | 82.9 | 4.1 | 68.0 |
| | 10 | — | — | — | — | — | 6.7 |
| | 15 | — | — | — | — | — | 2.2 |

TABLE 2-continued

| Example No. | Quantity of Polymer Processing Aid Added (part) | Properties of Vinyl Chloride Resin Composition | | | | |
|---|---|---|---|---|---|---|
| | | Strength & Elongation | | Surface Smoothness | Transparency | | Izod Impact Strength (kg . cm/cm) |
| | | Elongation (%) | Breaking Strength (kg/cm$^2$) | | Tp (%) | H (%) | |
| 3 | 5 | 186 | 7.6 | A | 81.6 | 5.1 | 75.2 |
| | 10 | — | — | — | — | — | 7.8 |
| | 15 | — | — | — | — | — | 3.9 |

As is apparent from Table 2, the polymer processing aid of this invention, when added to vinyl chloride polymers, exhibits a remarkable effect of improving the processability of the polymers, similarly as known polymer processing aids, improving, for example, the surface smoothness and increasing the tensile elongation at high temperatures of formed polymer products, without impairing the transparency thereof.

Further, when used in combination with an impact strength modifier for vinyl chloride polymers, the polymer processing aid of this invention is found to be excellent inasmuch as it does not lower the impact strength of the polymers to the extent that known polymer processing aids do.

What is claimed is:

1. A vinyl chloride resin composition comprising:
   (1) 100 parts of a vinyl chloride polymer; and
   (2) 0.1 to 30 parts of a polymer processing aid comprising:
      (A) 40 to 90 parts of a copolymer comprising
         80 to 100% of an alkyl methacrylate, and
         0 to 20% of a monomer copolymerizable therewith; and
      (B) 60 to 10 parts of a copolymer comprising
         20 to 79% of an alkyl methacrylate,
         20 to 79% of an aromatic vinyl monomer,
         1 to 49% of a diolefin, and
         0 to 20% of a monomer copolymerizable therewith,
   100 parts of said polymer processing aid having been obtained by polymerizing 60 to 10 parts of the constituent monomers of the copolymer (B) in the presence of 40 to 90 parts of the copolymer (A), all quantities expressed in parts and percentages being by weight.

2. A vinyl chloride resin composition as claimed in claim 1, wherein the copolymer (B) comprises 30 to 69% of an alkyl methacrylate, 30 to 69% of an aromatic vinyl monomer, and 1 to 30% of a diolefin.

3. A vinyl chloride resin composition as claimed in claim 1, wherein the composition further comprises 1 to 30 parts by weight of an impact strength modifier selected from the group consisting of acrylonitrile/butadiene/styrene copolymers, and methyl methacrylate/butadiene/styrene copolymers which are different from the copolymer (B) present in the composition, per 100 parts by weight of the vinyl chloride polymer.

4. A vinyl chloride resin composition as claimed in claim 1 or 2, wherein the alkyl methacrylate has an alkyl group of 1 to 8 carbon atoms.

5. A vinyl chloride resin composition as claimed in claim 4, wherein the alkyl methacrylate is methyl methacrylate.

6. A vinyl chloride resin composition as claimed in claim 1, wherein the diolefin is selected from the group consisting of butadiene, isoprene, and chloroprene.

7. A vinyl chloride resin composition as claimed in claim 6, wherein the diolefin is butadiene.

8. A vinyl chloride resin composition as claimed in claim 1, wherein the aromatic vinyl monomer is selected from the group consisting of styrene, α-methyl styrene, and chlorostyrene.

9. A vinyl chloride resin composition as claimed in claim 8, wherein the aromatic vinyl monomer is styrene.

10. A vinyl chloride resin composition as claimed in claim 1, wherein the constituent monomers of the copolymer (A) or (B) are selected from the group consisting of methyl acrylate, ethyl acrylate, n-butyl acrylate, 2-ethylhexyl acrylate, acrylonitrile, methacrylonitrile, methyl vinyl ether, ethyl vinyl ether, methyl vinyl ketone, ethyl vinyl ketone, vinyl acetate, divinylbenzene, and ethylene glycol dimethacrylate.

* * * * *